United States Patent [19]

Aiba et al.

[11] Patent Number: 5,367,952
[45] Date of Patent: Nov. 29, 1994

[54] APPARATUS FOR HANDLING LUG SCRAP STRIPS FROM METALLIC STRIP SLITTERS

[75] Inventors: Junichi Aiba; Yoshiharu Sasaki, both of Tokyo, Japan

[73] Assignee: The Furukawa Electric Co., Ltd., Japan

[21] Appl. No.: 75,902

[22] Filed: Jun. 14, 1993

[51] Int. Cl.$^5$ .................... B30B 15/30; B30B 9/00
[52] U.S. Cl. ........................ 100/45; 100/97; 241/35; 241/60; 241/101.2
[58] Field of Search ............. 100/39, 45, 94–97; 241/35, 57, 60, 101.2

[56] References Cited

U.S. PATENT DOCUMENTS

| | | | |
|---|---|---|---|
| 3,189,286 | 6/1965 | O'Connor | 100/97 X |
| 3,949,036 | 4/1976 | Nelson | 100/97 X |
| 4,075,942 | 2/1978 | Johnson, Jr. | 100/45 X |
| 4,657,192 | 4/1987 | Browning | 241/60 X |
| 5,170,949 | 12/1992 | Buck et al. | 241/35 |

*Primary Examiner*—Stephen F. Gerrity
*Attorney, Agent, or Firm*—Lorusso & Loud

[57] ABSTRACT

Apparatus for handling lug scrap strips produced by the slitting of metallic strips in a metallic strip slitter. The lug scrap strip handling apparatus includes air ducts for transfer of the lug scrap strips, a scrap cutter provided in the air duct for continuously cutting the long lug scrap strip to a predetermined length, a blower provided downstream of the scrap cutter and connected to the air duct, a scrap collector provided at the end of the air duct, and a scrap press attached to the scrap collector. The scrap cutter drive is controlled in synchronization with the line speed of the metallic strip slitter to prevent plugging of the scrap cutter by the lug scrap strip pieces.

4 Claims, 4 Drawing Sheets

APPARATUS FOR HANDLING LUG SCRAP STRIPS FROM METALLIC STRIP SLITTERS

BACKGROUND OF THE INVENTION

1. Field of the Invention

This invention relates to a device for handling lug scrap strips produced by the slitting of metallic strips in a metallic strip slitter. The apparatus handles lug scrap strips formed either by slitting a wide metallic strip into a plurality of narrow metallic strips by means of slitter knives, or by slitting the wide metallic strip lugs from both sides of the wide metallic strip. More specifically, it relates to a lug scrap strip handling device which is suited to use with a metallic strip slitter of the type used to produce thin metallic strips.

2. Description of the Prior Art

Referring to FIGS. 4 through 6, a conventional handling apparatus for lug scrap strips from a metallic strip slitter will be explained.

A wide and thin metallic strip 1 (e.g., aluminum or its alloy having a thickness of 0.4 mm or less) from a coil on a core 20 of an uncoiler 2 is continuously delivered by a pair of pinch rollers 30 in the direction indicated by arrow A in alignment with a slitter 3a. Subsequently, the metallic strip 1 is flattened while being guided by guide rollers 31 and 32 in a S-letter path. Then, the metallic strip 1 is fed by another pair of pinch rollers 33 into slitter knives 3.

The metallic strip 1 is slit by the slitter knives 3 and divided into a plurality of narrow metallic strips 10 as a product and lug scrap strips 11 at beth edges.

The metallic strips 10 as a product are passed through a pair of pinch rollers 34, a loop pit 35 and another pair of pinch rollers 36, and then rolled round a core 40 of a coiler 4.

The resulting lug scrap strips 11 are guided to an air duct 5a in a lug scrap strip treatment device b by other pinch rollers b1 and b2, and then cut and crushed by a blower/crusher 5.

As shown in FIGS. 5 and 6, the blower/crusher 5 comprises: a rotating blade 50 mounted on the end of a rotating shaft 51; a casing 52 for accommodating the rotating blade 50 and rotatably supporting the rotating shaft 51; an admission port 53 formed in the casing 52 facing the rotating blade 50; and an exhaust port 54 formed in the casing 52 so as to extend in the direction of rotation of the rotating blade 50.

Since rotary cutting blades 55 for crushing and fixed cutting blades 56 are attached to the rotating blade 50 and the admission port 53 of the casing 52, respectively, a long lug scrap strip 11 entering through the admission port 53 is cut, crushed and deformed by these cutting blades 55 and 56. The resulting cut and crushed pieces 12 are passed through the air duct 5b, shown in FIG. 4, are fed to a cyclone type scrap collector 6 and are then released into a chamber 70 of a scrap press 7 provided under discharge port 60 in the lower portion of the scrap collector 6.

When the crushed pieces 12 within the chamber 70 reach a predetermined quantity or more, the crushed pieces 12 are pressed by a piston 71, moving to the right in the drawing, to be compacted into a mass, and thereafter removed by opening a gate 72.

In the lug scrap strip treatment device b of the prior art described above, the long lug scrap strip 11 is cut and crushed by the blower/crusher 5 and the cut and crushed pieces 12 vary extremely in length. Hence, there is a problem in that the crushed pieces 12 cut in longer sizes than the minimum inner diameter of the air duct 5b at the rear of the blower 5 are easily caught on the internal surfaces of the air duct 5b and the exhaust port 60 of the scrap collector 6, and a majority of problems encountered are caused by the plugging-up of the scrap strip pieces in the air duct 5b and the scrap collector 6.

The problems due to the plugging-up by the scrap strip pieces happen more often when the metallic strip 1 is thick than when it is thin.

SUMMARY OF THE INVENTION

It is an object of the present invention to provide a lug scrap strip handling device having no problem of plugging of the downstream scrap treatment line by cutting a long lug scrap strip forwarded from a slitter line into pieces as equal in length as possible.

Another object of the present invention is to provide a lug scrap strip handling device which can readily adjust the cut length of the lug scrap strip to a length which does not cause plugging-up by the scrap strip pieces in the downstream scrap treatment line.

For accomplishing the objects described above, the lug scrap strip handling device of the present invention includes: an air duct for guiding a long lug scrap strip; a scrap cutter, provided in the path of the air duct, for continuously cutting the lug scrap strip to a predetermined length; a blower installed downstream of the scrap cutter in the path of the air duct; a scrap collector provided at the end of the air duct; and a scrap press attached to the scrap collector. The drive of the scrap cutter is controlled in synchronization with the line speed of the metallic strip slitter.

It is preferable that the scrap cutter includes: a rotor having one or a plurality of rotary cutting blades provided on the outer periphery of the scrap cutter in parallel with a rotating center shaft; a casing, having a supply port and an exhaust port aligned with the direction of flow through the air duct, for rotatably supporting the rotor so that the rotary cutting blade is transverse to the direction of flow through the air duct; and a fixed cutting blade provided adjacent the supply port of the casing. The rotary cutting blades are diametrically opposed and are brought into contact with the fixed cutting blade repeatedly or in close proximity to the fixed cutting blade by the rotation of the rotor.

In operation of the lug scrap strip handling apparatus of the present invention, a lug scrap strip is slit from a wide metallic strip by a slitter knife, then guided into the air duct and conveyed to the scrap cutter. Since the scrap cutter continuously cuts the lug scrap strip to a predetermined length and the drive of the scrap cutter is controlled in synchronization with the line speed of the slitter, the lug scrap strip is cut to an approximately constant length by the scrap cutter. The cut lug scrap strip pieces are deformed by the blower while being pneumatically transferred by the air stream along the air duct. Thereafter, the resultant lug scrap strip pieces are fed to the scrap collector and then supplied to the scrap press. When a predetermined quantity of such lug scrap strip pieces are collected, these lug scrap strip pieces are pressed into a mass by the scrap press.

As described above, the long lug scrap strips are cut to an approximately constant length by the scrap cutter, and therefore, the lug scrap strip pieces do not catch within the lug scrap strip treatment line and plugging is not caused by the lug scrap strip pieces.

The cut length of the lug scrap strip can arbitrarily be set depending on the degree to which the scrap cutter is synchronized with the line speed of the metallic strip slitter. Therefore, it is extremely easy to set the cut length of the lug scrap strip to that which avoids plugging by the scrap strip pieces of the scrap treatment line downstream of the scrap cutter.

The lug scrap strip handling apparatus of the present invention is not restricted only to the preferred embodiment as will be described hereinafter, but it is to be understood that the lug scrap strip handling apparatus may include modification, substitution and addition of other elements thereto within the spirit and the scope of the invention as defined in the claims.

BRIEF DESCRIPTION OF THE DRAWINGS

The foregoing and other objects and features of the invention will become apparent from the following description of the preferred embodiment of the invention with reference to the accompanying drawings, in which.

DETAILED DESCRIPTION OF THE EMBODIMENT

Figure 1:
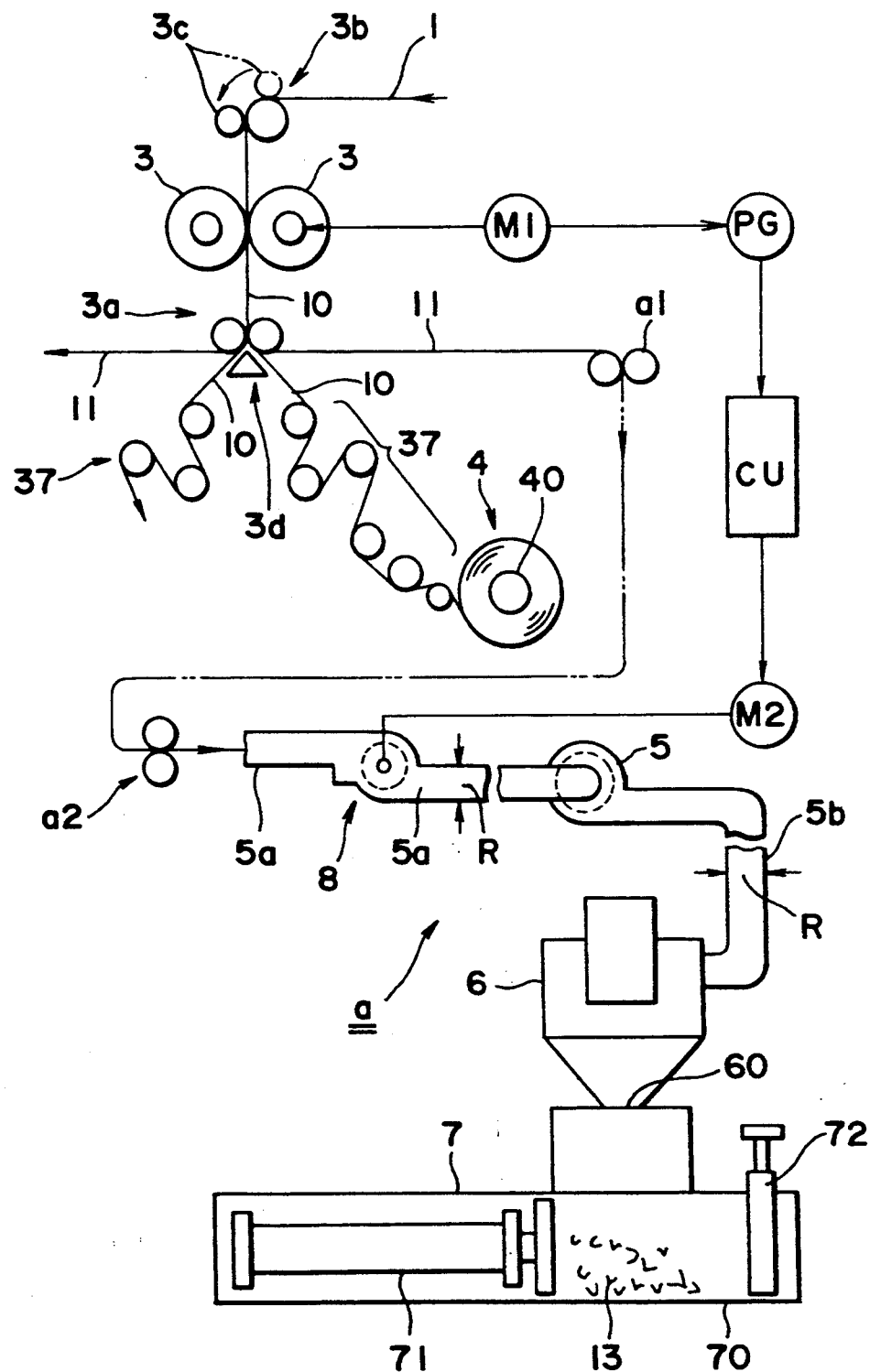
FIG. 1 is a schematic diagram of a preferred embodiment of the present invention.
Figure 2:
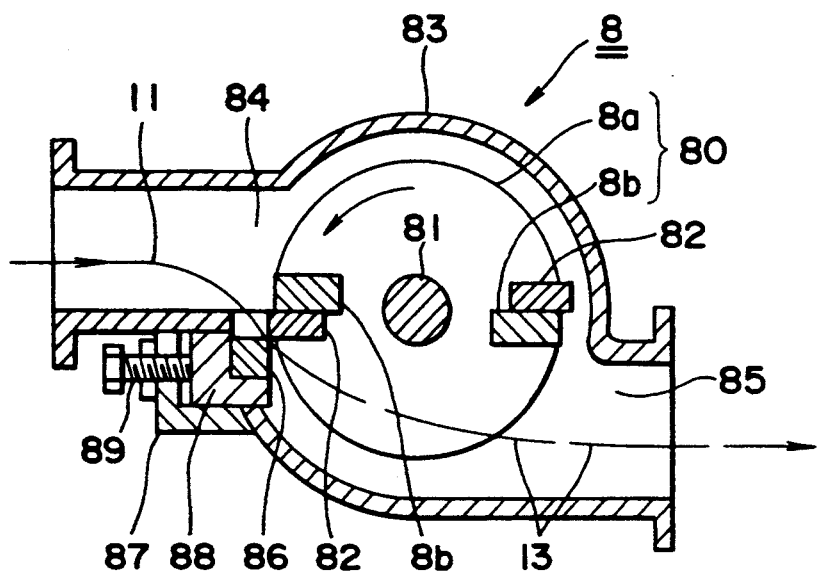
FIG. 2 is a side sectional view showing a scrap cutter used in the embodiment of FIG. 1.
Figure 3:
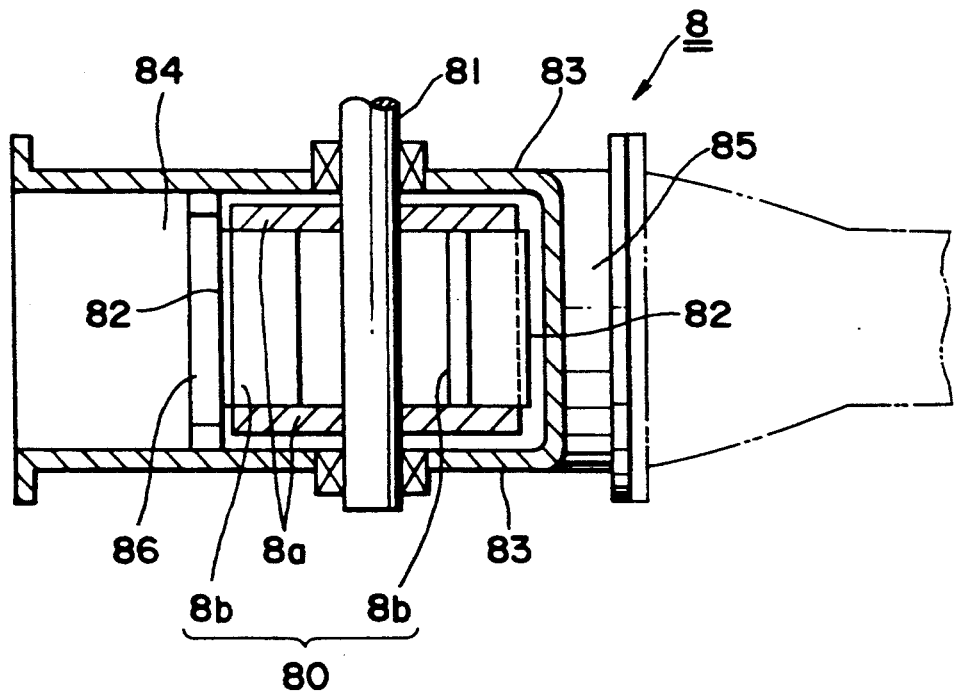
FIG. 3 is a plan cross-sectional view of the scrap cutter of FIG. 2.

Referring now to FIGS. 1 through 3, a detailed description will be provided for one preferred embodiment of a lug scrap strip treatment system of the present invention.

Figure 4:
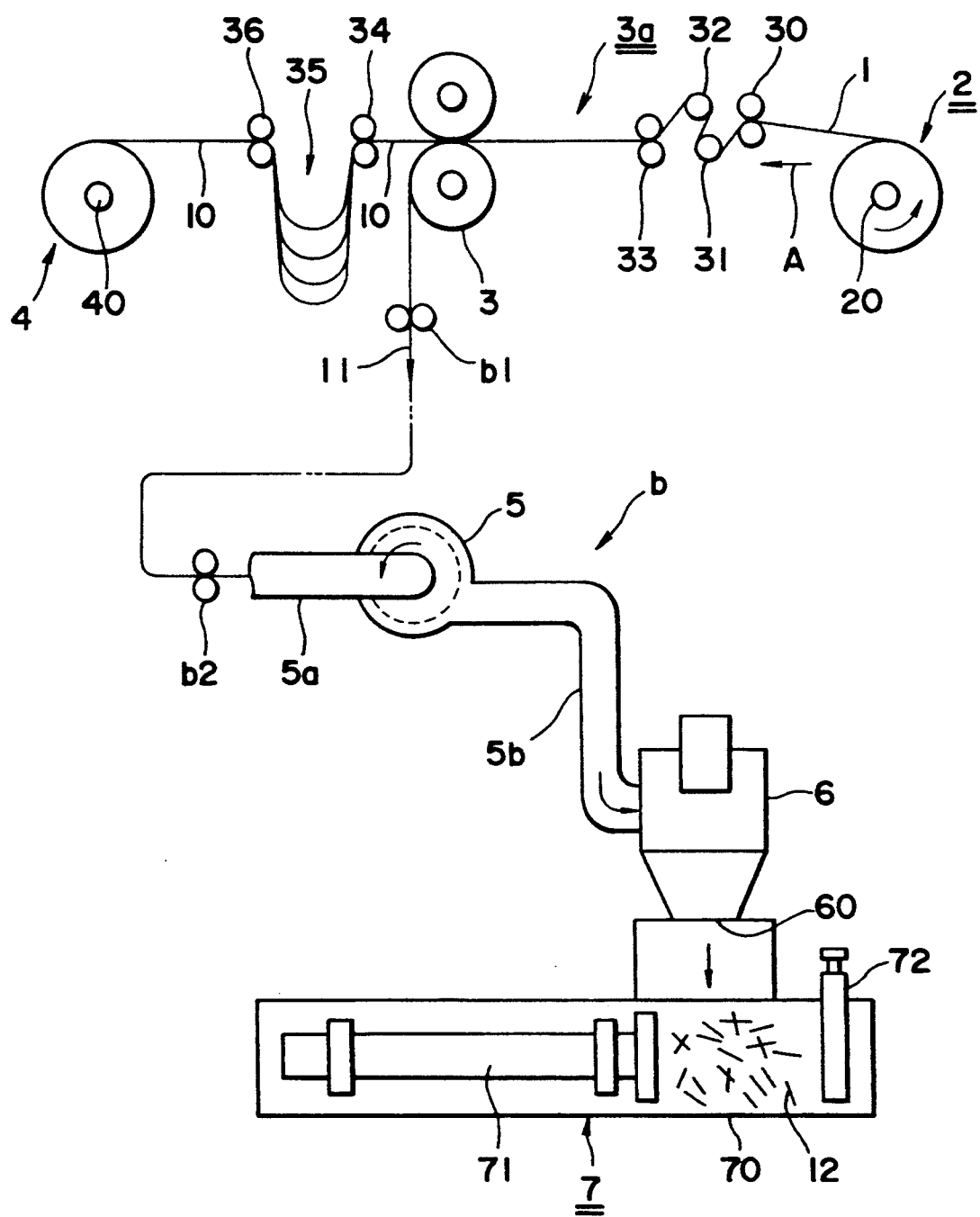
FIG. 4 is a schematic view of a metallic strip slitter combined with a lug scrap strip treatment device of the prior art.
Figure 5:
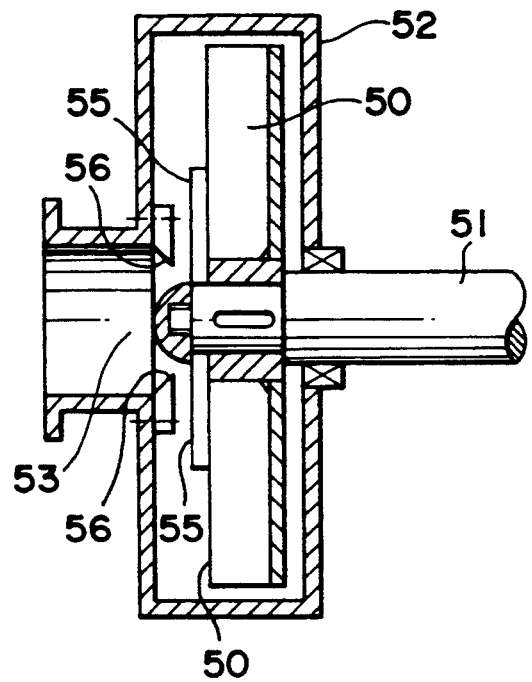
FIG. 5 is a longitudinal cross-sectional view showing a blower used in the prior art lug scrap strip treatment system of FIG. 4.
Figure 6:
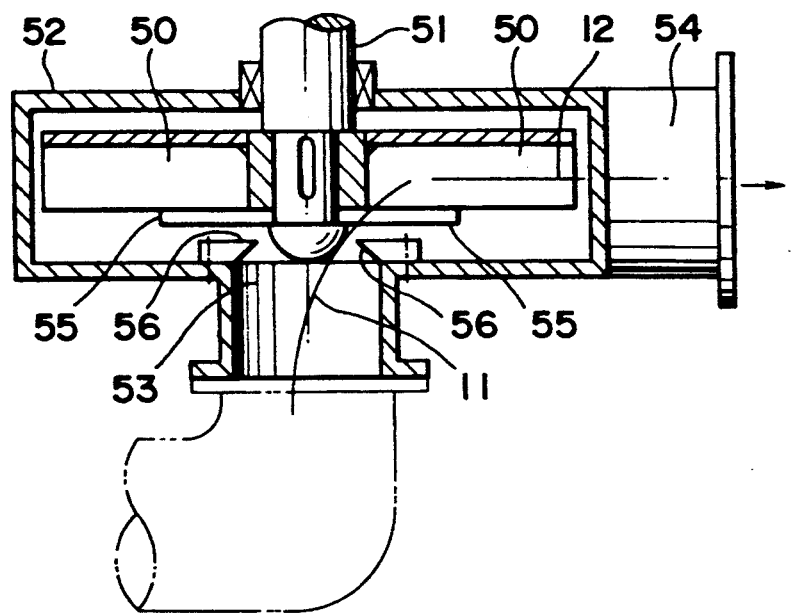
FIG. 6 is a plan cross-sectional view of the blower of FIG. 5.

The following description of preferred embodiments uses the same names used to describe the prior art in connection with FIGS. 4–6, to the extent feasible.

A wide metallic strip 1 delivered from an uncoiler (not shown) into the line of a slitter 3a is pinched between a pair of pinch rollers 3b and 3c while being guided by a guide (not shown), and then pinched between slitter knives 3 provided below the pinch rollers.

When the tip end of the metallic strip 1 is pinched between the pair of pinch rollers 3b and 3c, the upper roller 3c is shifted from the position indicated by a chain double-dashed line to that indicated by a solid line in FIG. 1, and the metallic strip 1 is guided between the slitter knives 3 by turning the advancing direction of the metallic strip downward 1.

The wide metallic strip 1 is slit by the slitter knives 3 and divided into a plurality of narrow metallic strips 10' and lug scrap strips 11 at both edges.

The metallic strips 10' are alternately distributed by a distributing unit 3d to the right and left sides so as to separate the mutually adjacent strips from each other, and then guided by a guide roller group 37 to be rolled around the core 40 of the coiler 4.

The lug scrap strips 11 at both edges are separated from the metallic strips 10' by the distributing unit 3d and simultaneously distributed to the right and left sides, and guided by a pair of pinch rollers a1 and a2 to an air conveyor 5a of a lug scrap strip treatment subsystem a of this preferred embodiment.

Since the peripheral speed of the pair of pinch rollers a1 and a2 which feed the lug scrap to cutter 5a is synchronized with the peripheral speed of the slitter knife 3, the lug scrap strip 11 is fed to the air conveyor 5a in synchronization with the line speed of slitter 3a.

The lug scrap strip treatment subsystem a includes: an air conveyor 5a, to which the lug scrap strips 11 produced by the slitter knives 3 are supplied; a scrap cutter 8 for cutting the lug scrap strips at a predetermined period as they pass through the air conveyor 5a; a blower 5 installed downstream of the scrap cutter 8: a cyclone type scrap collector 6 installed at the end of the air-operated duct 5b; and a scrap press 7 mounted below the scrap collector 6.

The drive of the scrap cutter 8 is controlled on the basis of the line speed of the metallic strip slitter 3a.

As shown in FIGS. 2 and 3, the scrap cutter 8 of this preferred embodiment has a rotor 80 with two cutting blades 82 provided on its outer periphery in parallel with a rotary shaft 81 at an interval of 180°. A casing 83 has a supply port 84 and an exhaust port 85 oriented in the direction of flow through the air conveyor (duct) 5a and for rotatably supporting the rotor 80 so that each rotary cutting blade 82 is transverse to the direction of air flow through the air-operated duct 5a. A fixed cutting blade 86 provided adjacent the supply port 84 of the casing 83 so that the rotary cutting blades 82 are opposed to and brought into contact with the fixed cutting blade 86 repeatedly by the rotation of the rotor 80. Due to the counterclockwise rotation of the rotor 80 in FIG. 2, the lug scrap strip 11 is cut in predetermined short lengths by cooperation of the fixed cutting blade 86 and the rotary cutting blades 82 to give lug scrap strip pieces 13.

The rotor 80 comprises two disk-like plates 8a fixed to the rotary shaft 81 and connection plates 8b for interconnecting disks 8a.

The fixed cutting blade 86 is provided at the lower edge of the internal side of the supply port 84 transverse to the air flow direction, as shown in FIG. 2. In this embodiment, a support member 88 is fixed within a pocket defined by a bracket 87 and opening into the lower portion of the supply port 84, and the fixed cutting blade 86 is fixed to this support member 88. When each rotary cutting blade 82 or the fixed cutting blade 86 wears, the fixed cutting blade 86 can be pushed inward together with the support member 88 by turning a screw 89 which fixes the support member 88 to the inside of the pocket 87.

In this preferred embodiment, the drive of the scrap cutter 8 is controlled by the line speed Df the slitter 3a as follows:

Namely, as shown in FIG. 1, the speed of revolution of motor M1 which drives the slitter knife 3 is detected by, for example, a speed sensor PG including a pulse generator and the resulting detected value is input to a control unit CU. Then, the peripheral speed of the slitter knife 3 is calculated from the value detected by the speed sensor PG and the outer diameter of the slitter knife 3, and this calculated value is used by control unit CU as a line speed to control a motor M2 which drives the rotor 80 in the scrap cutter 8.

Specifically, the minimum inner diameter R of the air ducts 5a and 5b downstream of the scrap cutter 8 in FIG. 1 is approximately 200 mm in this preferred embodiment, and therefore, the motor M2 is controlled so that the rotor 80 is rotated in synchronization with the peripheral speed of the slitter knife 3, which is equal to the line speed of the slitter 3a. Accordingly, the length of a lug scrap strip piece in FIG. 2, resulting from cutting the lug scrap strips 11 by the scrap cutter 8, is never more than 200 mm.

The slitter knife 3 in this preferred embodiment has two pairs of rotary cutters with edges in contact with and rotating in synchronization with each other, but the peripheral speed of either may be calculated as a line speed for controlling the rotor 80 of the scrap cutter 8.

The blower 5 used in this preferred embodiment has a structure approximately similar to that of the prior art as shown in FIGS. 5 and 6, and therefore, further explanation thereof is omitted. However, the blower 5 can be replaced with any ordinary blower having only rotary blades, instead of the blower of a crusher structure.

In accordance with the lug scrap strip treatment subsystem A of this preferred embodiment, the lug scrap strip 11 continuously fed to the air-operated duct 5a shown in FIG. 1 is continuously cut to an approximately constant length (not more than 200 mm) by the scrap cutter 8. The cut lug scrap strip pieces 13 are bent when passing through the blower 5 so that the lug scrap strip pieces 13 readily intermingle with one another when pressed as will be described later. Then, the bent lug scrap strip pieces pass through the air duct 5b, are pneumatically transferred to the scrap collector 6, and fall down into the chamber 70 of the scrap press 7 from the exhaust port 60 of the scrap collector.

When the lug scrap strip pieces 13 in the chamber 70 reach a predetermined quantity, the discharge port 60 of the scrap collector 6 is closed and the lug scrap strip pieces 13 are compressed by a press 71 moving to the right in FIG. 1 to be formed into an intermingled mass. The mass is taken out from the chamber 70 by opening the gate 72. After taking the mass out of the chamber 70, the press 71 and the gate 72 are allowed to return to the position illustrated in FIG. 1 and the discharge port 60 of the collector 6 is opened.

The device of this preferred embodiment is not susceptible to plugging by the scrap strip pieces and not only smoothly handles the lug scrap strip by controlling the scrap cutter as described above, but also cuts each lug scrap strip piece to a predetermined length. The device is effective in the handling of lug scrap strips, particularly in the case of slitting thin metallic strips of not more than 0.15 mm at high speed.

This preferred embodiment was described as including a scrap cutter 8 having rotary cutting blades 82 and fixed cutting blades 86, but it may be possible to use, as the scrap cutter 8, a cutter which reciprocates upward and downward relative to the fixed blade 86, instead of the rotary cutter portion 82. In brief, any cutter may be utilized so long as it has the capability to continuously cut the delivered lug scrap strip 11 to a predetermined length.

A cyclone is shown with the collector 6, but instead of the cyclone, a hopper or other structure which effectively collects the transferred lug scrap strip pieces 13 may be used.

What is claimed is:

1. Apparatus for cutting and recovering lug scrap strips from a metallic strip slitter comprising:
    a sensor for detecting the line speed of the metallic strip slitter;
    a scrap cutter for continuously cutting the lug scrap strips to a predetermined length;
    control means for driving said scrap cutter responsive to the line speed of the metallic strip slitter sensed by said line speed sensor;
    air duct means for pneumatically conveying the lug scrap strips from the metallic strip slitter to said scrap cutter and for conveying the cut lug scrap strips of predetermined length from said scrap cutter;
    a blower connected to said air duct means downstream of said scrap cutter;
    a scrap collector provided at the end of said air duct means, for collecting the cut scrap strips of predetermined length; and
    a scrap press for receiving the collected cut scrap strips from said scrap collector and for pressing same into a unitary mass.

2. Apparatus according to claim 1 wherein said scrap cutter means comprises:
    a casing including:
        a supply port aligned with and connected to said air duct means;
        an exhaust port aligned with and connected to said air duct means; and
        a fixed cutting member adjacent said supply port;
    a rotor including:
        a central shaft rotatably mounted in said casing;
        at least one rotary cutting member mounted on the periphery of said rotor, in parallel with said central shaft and traversing said supply port, said rotary cutting member repeatedly providing a cutting action in cooperation with said fixed cutting member as said rotor is rotated; and
    wherein said control means controls the rotary speed of said rotor as a function of the line speed of said metallic strip slitter.

3. Apparatus according to claim 2 wherein said control means controls the rotary speed of said rotor of said scrap cutter as a function of the peripheral speed of a cutter knife in said metallic strip slitter so that the predetermined length of the cut lug scrap strips is no greater than the minimum interior diameter of said air duct means downstream of said scrap cutter.

4. Apparatus in accordance with claim 2 wherein said rotor carries two diametrically opposed rotary cutting members and the total of said cutting members is two in number.

* * * * *